US006612586B2

(12) United States Patent
Liou

(10) Patent No.: US 6,612,586 B2
(45) Date of Patent: Sep. 2, 2003

(54) RELEASABLE ENGAGEMENT OF TOOL WITH HOLDER

(76) Inventor: Mou-Tang Liou, No. 57, Kung Yeh North Road, Nan Kang Industrial Park, Nantou City, Nantou Hsien (TW)

( * ) Notice: Subject to any disclaimer, the term of this patent is extended or adjusted under 35 U.S.C. 154(b) by 27 days.

(21) Appl. No.: 09/941,991

(22) Filed: Aug. 29, 2001

(65) Prior Publication Data

US 2003/0041459 A1 Mar. 6, 2003

(51) Int. Cl.[7] ................................................ B23B 31/06
(52) U.S. Cl. ......................................... 279/22; 408/238
(58) Field of Search ..................... 82/160, 161; 279/30, 279/22, 75, 80; 173/48; 408/240, 57; 409/234, 231, 232, 240; 7/167

(56) References Cited

U.S. PATENT DOCUMENTS

| | | | | | |
|---|---|---|---|---|---|
| 19,111 | A | * | 1/1858 | Harrington | 221/196 |
| 1,860,998 | A | * | 5/1932 | Darazick | 279/76 |
| 2,089,166 | A | * | 8/1937 | Reichhardt | 279/30 |
| 2,136,190 | A | * | 11/1938 | Gulfelt | 279/76 |
| 2,215,015 | A | * | 9/1940 | Richard | 29/242 |
| 2,405,961 | A | * | 8/1946 | Lapointe | 279/79 |
| 2,987,334 | A | * | 6/1961 | Wendling | 403/8 |
| 3,172,675 | A | * | 3/1965 | Gonzalez | 279/2.23 |
| 4,858,939 | A | * | 8/1989 | Riggs | 279/75 |
| 4,962,073 | A | * | 10/1990 | Martin et al. | 502/4 |
| 5,398,946 | A | * | 3/1995 | Quiring | 279/30 |
| 5,934,384 | A | * | 8/1999 | Wang | 173/132 |
| 6,270,085 | B1 | * | 8/2001 | Chen et al. | 279/22 |
| 6,325,393 | B1 | * | 12/2001 | Chen et al. | 279/22 |
| 6,375,398 | B1 | * | 4/2002 | Gaudreau et al. | 409/232 |
| 2001/0042964 | A1 | * | 11/2001 | Bedi et al. | 279/30 |

FOREIGN PATENT DOCUMENTS

| | | | | |
|---|---|---|---|---|
| DE | 342856 | * | 10/1912 | 279/39 |

* cited by examiner

*Primary Examiner*—Allan N. Shoap
*Assistant Examiner*—Ghassem Alie
(74) *Attorney, Agent, or Firm*—Alan D. Kamrath; Rider Bennett, LLP.

(57) ABSTRACT

A tool holder and tool combination comprises a tool holder and a tool. The tool holder comprises a compartment defined in an end thereof. The tool has an end releasably engaged in the compartment of the tool holder.

4 Claims, 7 Drawing Sheets

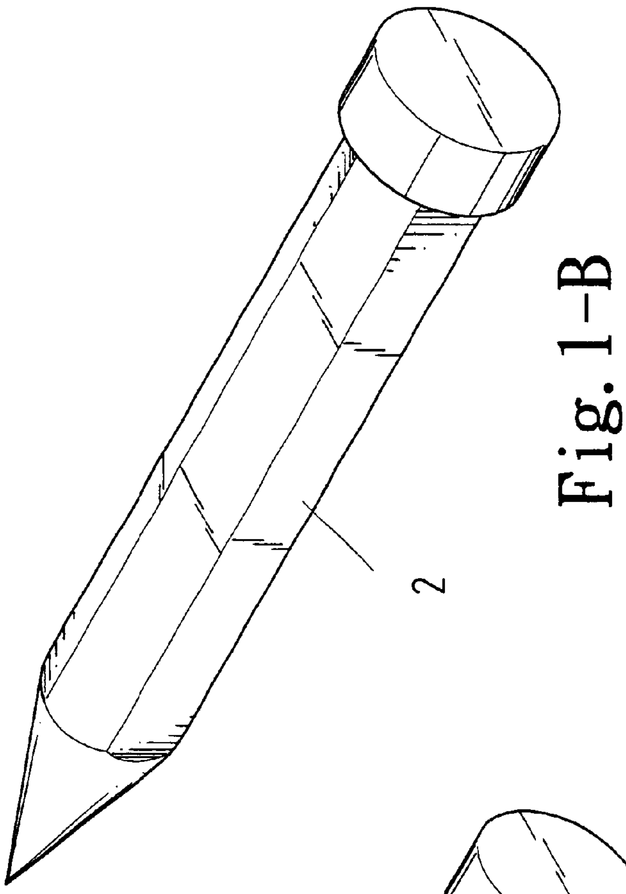
Fig. 1-B
PRIOR ART
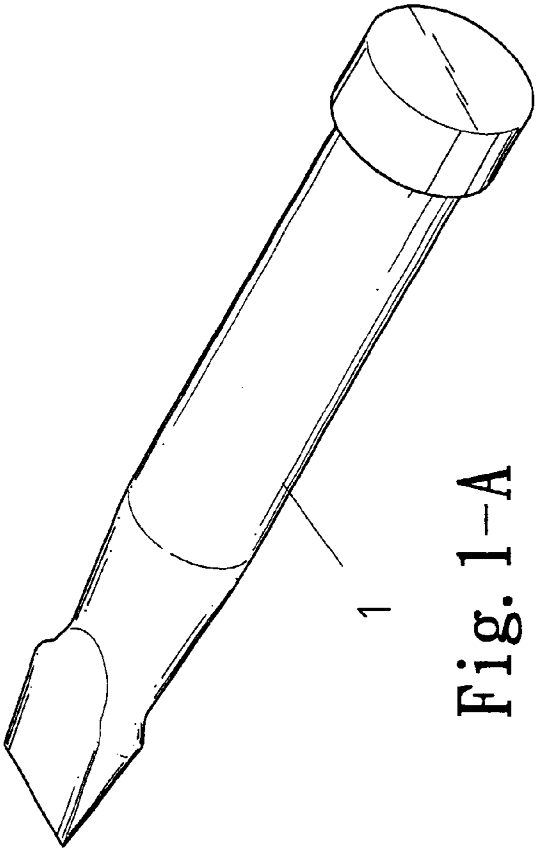
Fig. 1-A
PRIOR ART

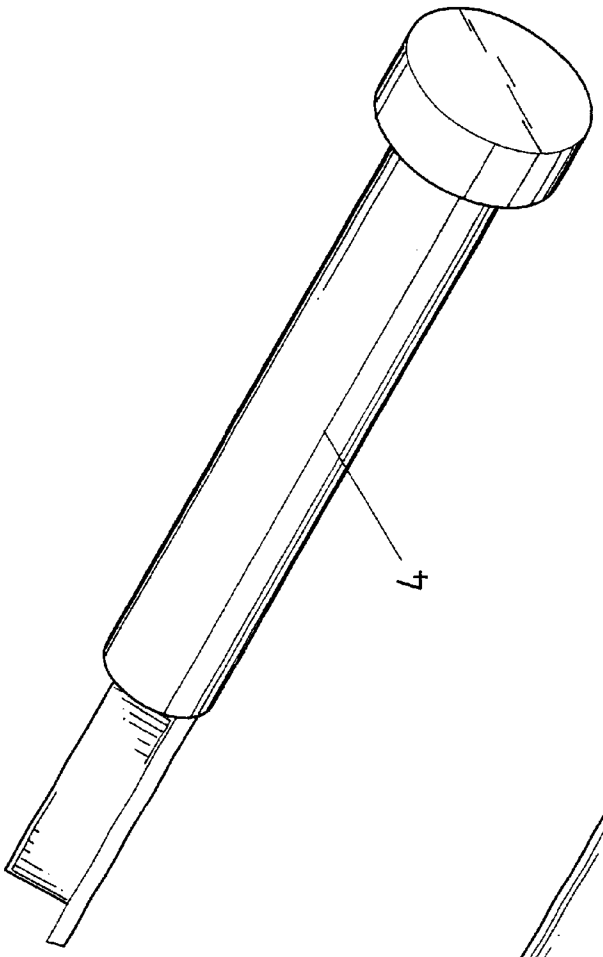
Fig. 2-B
PRIOR ART
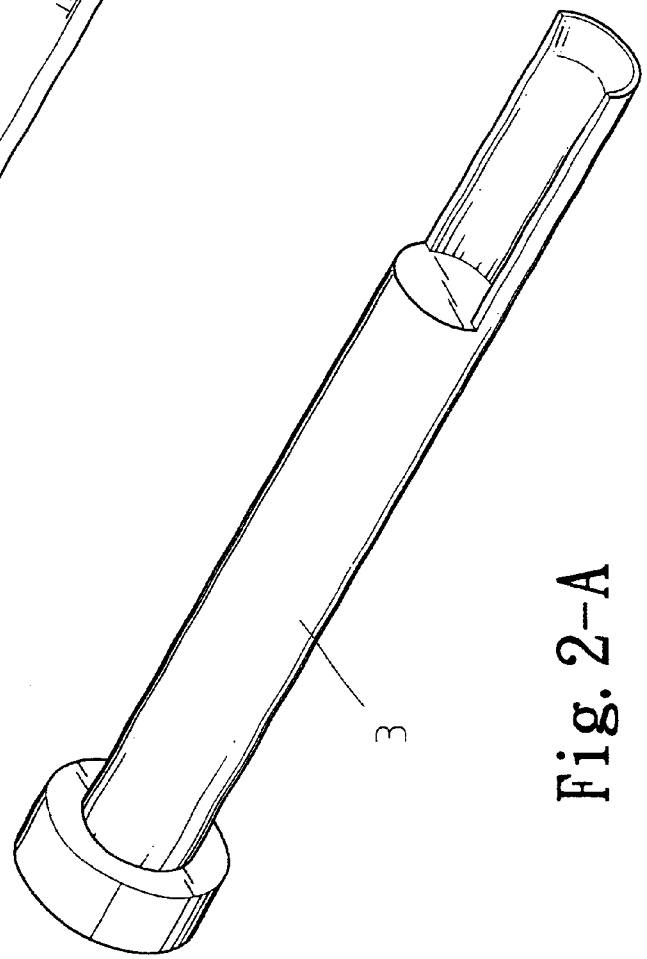
Fig. 2-A
PRIOR ART

RELEASABLE ENGAGEMENT OF TOOL WITH HOLDER

BACKGROUND OF THE INVENTION

1. Field of the Invention

The present invention relates to a tool holder and tool combination. In particular, the present invention relates to a tool holder and tool combination, wherein the tool that can be quickly attached to or removed from the tool holder.

2. Description of the Related Art

FIGS. 1A, 1B, 2A, and 2B of the drawings illustrate conventional impact tools 1, 2, 3, and 4 that are used with a hammer to perform different works. Carriage and storage of these tools are inconvenient to the users. Each of the tools is hammered by the hammer at an upper end thereof, and the lower end of each tool is configured to perform the required work. The overall volume of the tools can be reduced in the upper ends to solve the carriage and storage problem, which is the main object of the invention.

SUMMARY OF THE INVENTION

An object of the present invention is to provide a tool holder and tool combination, wherein the tool that can be quickly attached to or removed from the tool holder.

A tool holder and tool combination in accordance with the present invention comprises a tool holder and a tool. The tool holder comprises a first end and a second end. A compartment is defined in the second end of the tool holder. A receptacle is defined in the tool holder. At least one hole is defined in an inner periphery defining the compartment and communicated with the receptacle. A ball is received in the hole.

The tool comprises a first end releasably engaged in the compartment of the tool holder and a second end. The first end of the tool comprises at least one neck. A rod is received in the receptacle of the tool holder and comprises an end outside the receptacle for manual operation. The rod comprises at least one notch that faces the hole. The rod is slidable between a first position in which the ball is urged by the rod into the neck of the tool to thereby retain the tool in the compartment and a second position in which the ball is guided into the notch and thus disengaged from the neck of the tool to thereby allow removal of the tool from the compartment.

Other objects, advantages, and novel features of the invention will become more apparent from the following detailed description when taken in conjunction with the accompanying drawings.

BRIEF DESCRIPTION OF THE DRAWINGS

FIG. 1A is a perspective view of a conventional tool.

FIG. 1B is a perspective view of another conventional tool.

FIG. 2A is a perspective view of a further conventional tool.

FIG. 2B is a perspective view of still another conventional tool.

DETAILED DESCRIPTION OF THE PREFERRED EMBODIMENT

Figure 3:
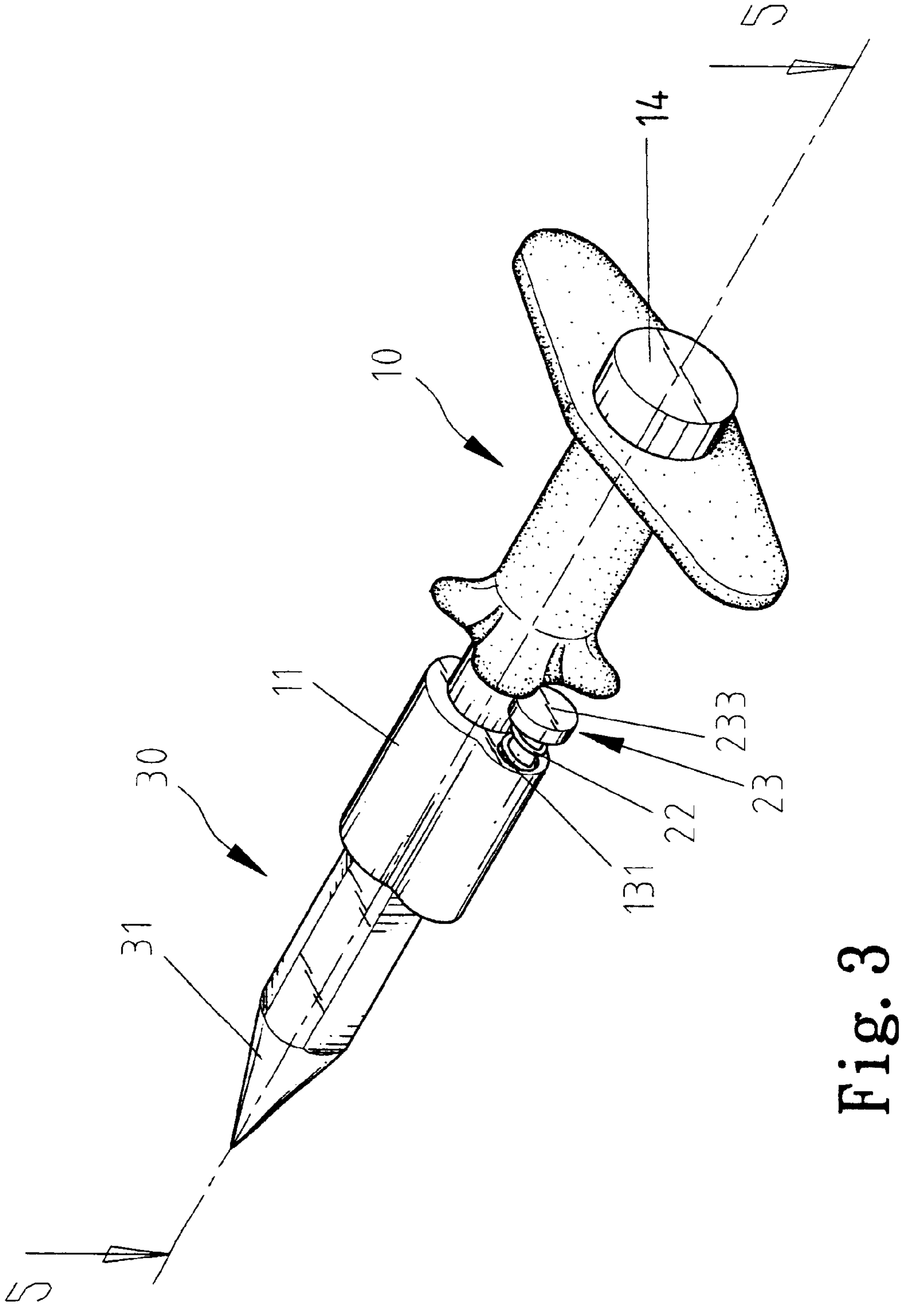
FIG. 3 is a perspective view of a tool holder and tool combination in accordance with the present invention.
Figure 4:
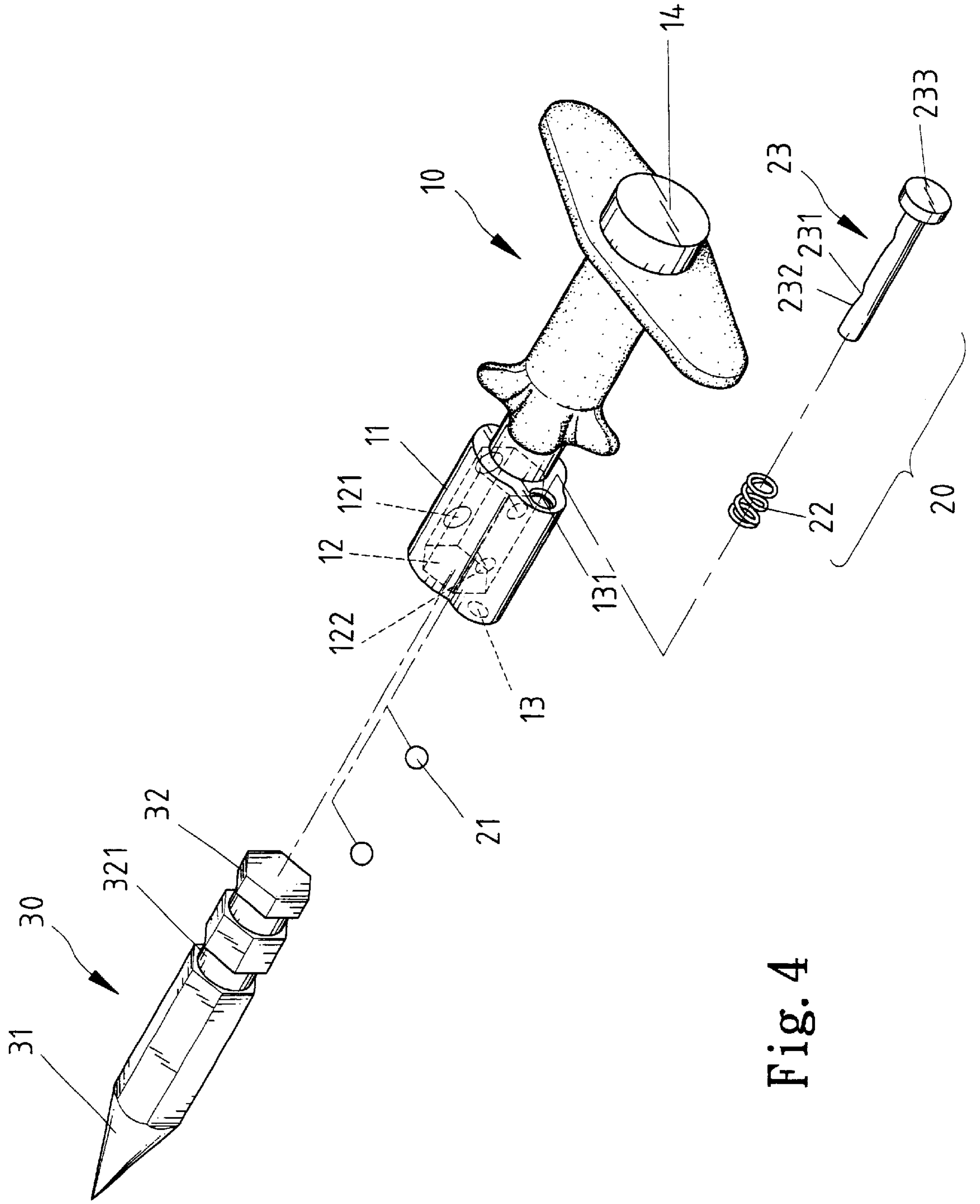
FIG. 4 is an exploded perspective view of the tool holder and tool combination in accordance with the present invention.
Figure 5:
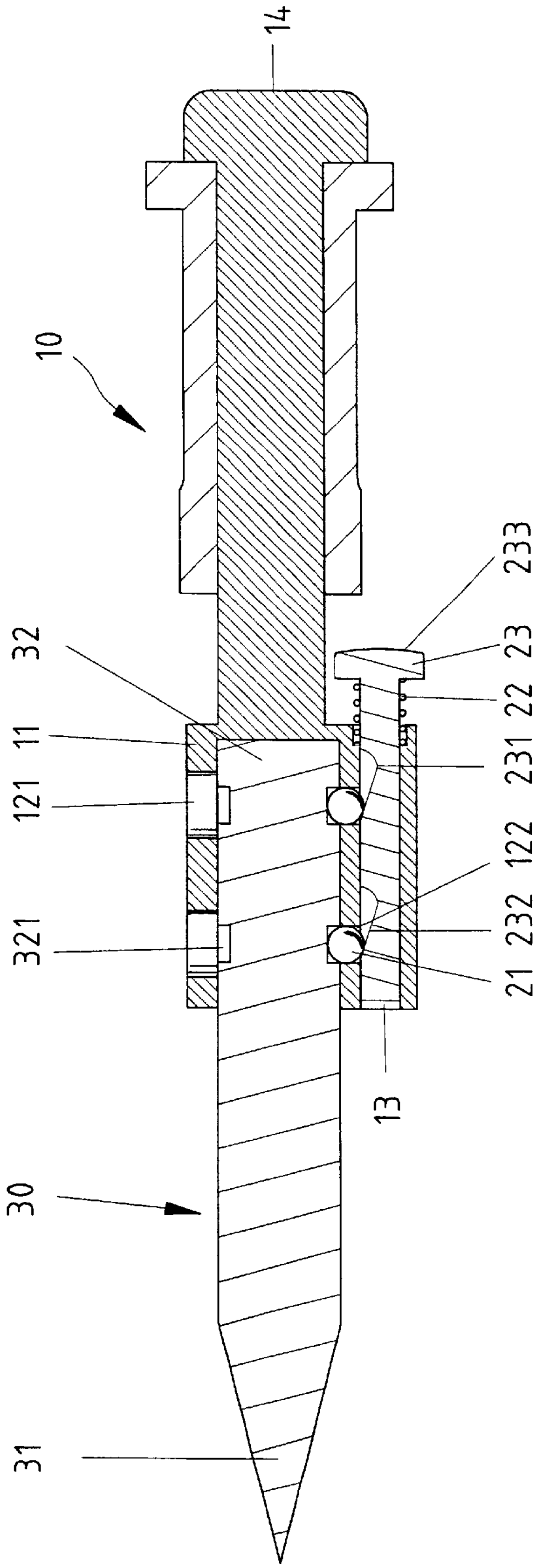
FIG. 5 is a sectional view taken along plane 5—5 in FIG. 4.

Referring to FIGS. 3 through 5, a tool holder and tool combination in accordance with the present invention generally comprises a tool holder 10 and a tool 30. The tool holder 10 comprises a first end 14 to be hammered by a hammer (not shown) or the like. The tool holder 10 further comprises a second end 11 in which a compartment 12 having an open end (not labeled) is defined. The user may grasp the tool holder 10 at an intermediate portion between the first end 14 and the second end 11 when in use.

A through-hole or receptacle 13 is defined in the second end 11 of the tool holder 10 and extends along a direction parallel to a longitudinal direction of the tool holder 10. At least one hole 122 is defined in an inner periphery defining the compartment 12. In this embodiment, two transverse holes 121 are formed by means of drilling the second end 11 of the tool holder 10 along a direction orthogonal to the longitudinal direction of the tool holder 10 until the drill (not shown) enters the receptacle 13 to thereby define two holes 122 that are defined in the inner periphery defining the compartment 12 and communicated with the receptacle 13. The receptacle 13 further includes a countersink 131 in an end thereof.

The tool 30 comprises a first end 32 for releasable engagement with the compartment 12 of the tool holder 10 and a second end 31 for performing specific work. The first end 32 of the tool 30 comprises two necks 321.

A retaining means 20 is provided to releasably retain the first end 32 of the tool 30 in the compartment 12 of the tool holder 10. The retaining means 20 comprises two balls 21 respectively, partially received in the holes 122 of the tool holder 10, a rod 23 slidably received in the receptacle 13 and having an end 233 outside the receptacle 13 for manual operation, and an elastic element 22 attached between the end 233 of the rod 23 and a bottom end face defining the countersink 131 of the receptacle 13 of the tool holder 10. The rod 23 comprises two cutouts or notches 231 each having an inclined face 232.

Figure 6:
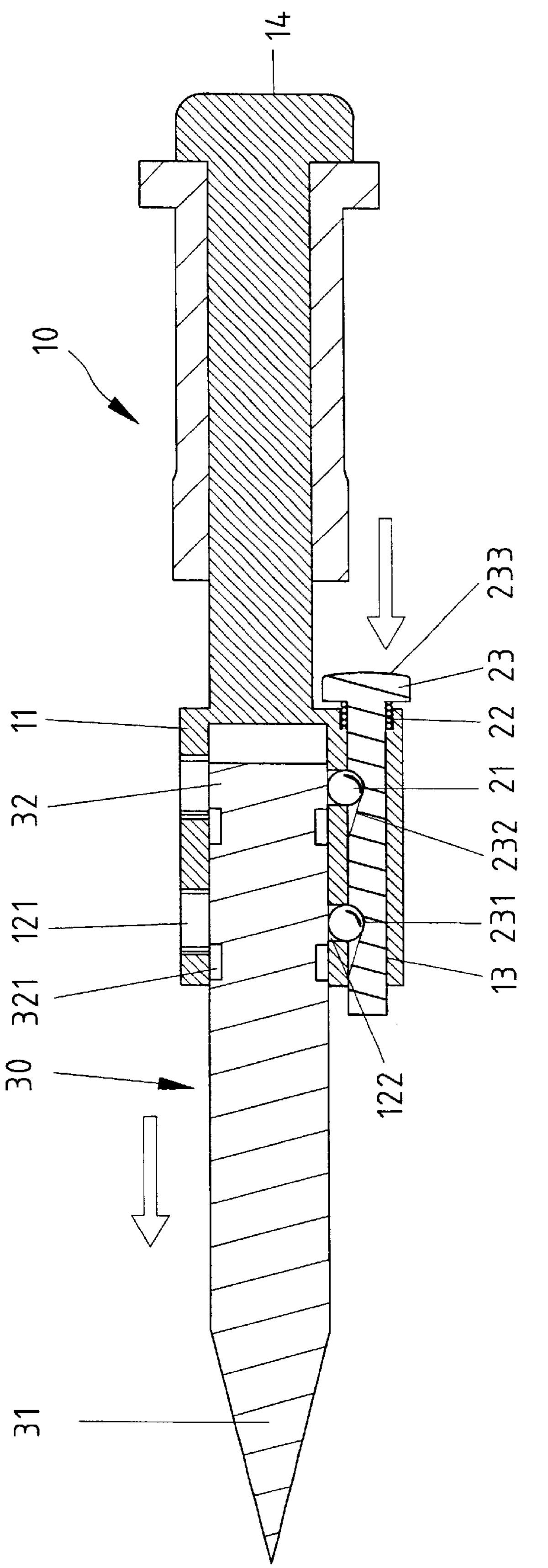
FIG. 6 is a sectional view similar to FIG. 5, illustrating disengagement of the tool from the tool holder.

As illustrated in FIG. 5, the elastic element 22 biases the rod 23 away from the receptacle 13 of the tool holder 10 such that the balls 21 are engaged in the necks 321 of the tool 30, thereby preventing disengagement of the tool 30 from the compartment 12 of the tool holder 10. When removal of the tool 30 is required, as illustrated in FIG. 6, the user pushes the end 233 of the rod 23 such that the balls 21 move into the notches 231 along the inclined faces 232, respectively. The balls 21 are thus disengaged from the necks 321 of the tool 30, thereby allowing disengagement of the tool 30 from the compartment 12 of the tool holder 10.

The size of the tool 30 is largely reduced in the first end 32 thereof, which is convenient to carriage and storage. When in use, the first end 32 of the tool 30 can be quickly engaged in the compartment 12 of the tool holder 10 and securely retained in place by the retaining means 20. The first end 32 of the tool 30 may be hexagonal and the compartment 12 of the tool holder 10 may also be hexagonal to prevent rotational movement of the tool 30 relative to the tool holder 10.

Figure 7:
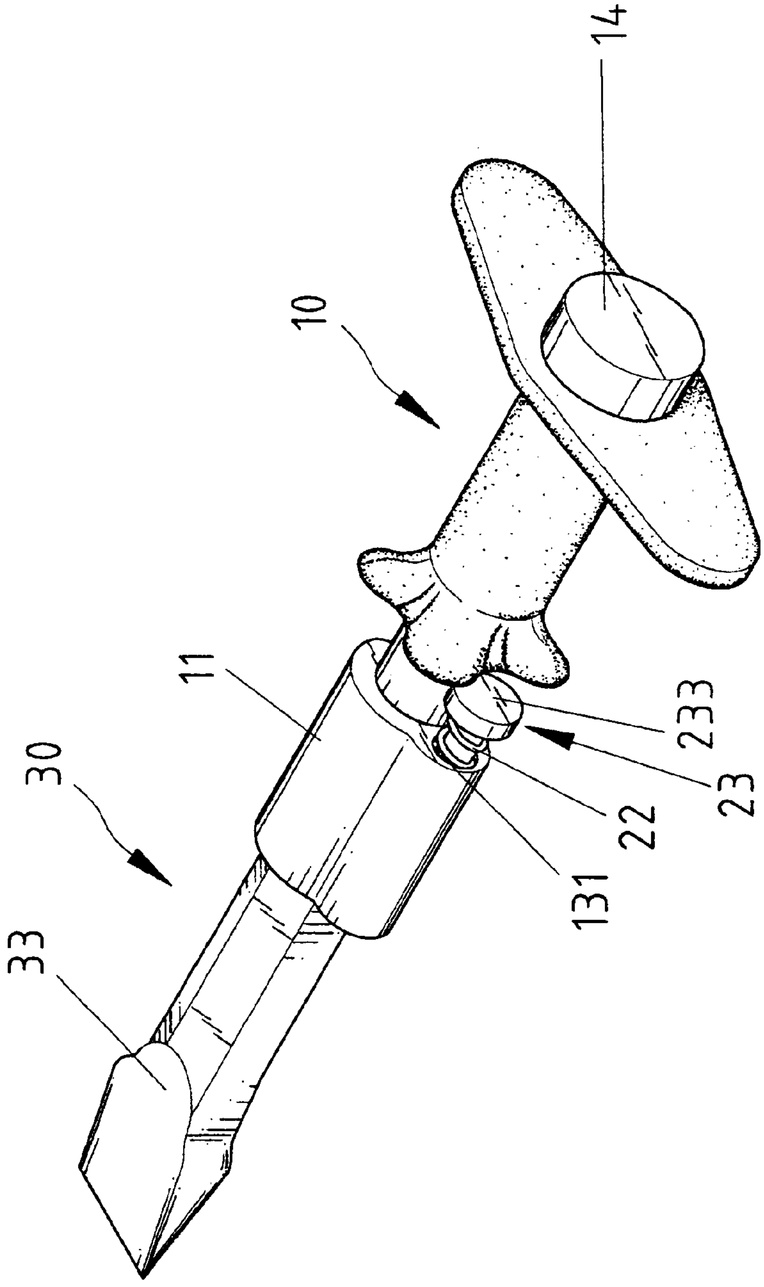
FIG. 7 is a perspective view of a modified embodiment of the tool.

FIG. 7 illustrates a modified embodiment, wherein the second end of the tool 30 is in the form of a flat head 33. It is noted that the second end of the tool 30 can be configured to any desired shape to proceed with the required work. The compartment 12 of the tool holder 10 may extend along a direction not parallel to or coincident with the longitudinal direction of the tool holder 10.

Although the invention has been explained in relation to its preferred embodiment, it is to be understood that many other possible modifications and variations can be made without departing from the scope of the invention as hereinafter claimed.

What is claimed is:

1. A tool holder and tool combination comprising:

a tool holder comprising a first end and a second end defining a compartment having a first central, longitudinal axis, a receptacle adjacent to said compartment and having a second central, longitudinal axis, said first and second axes being parallel to and spaced from each other, and at least one hole through which the compartment is communicating with said receptacle;

a tool having a first end releasably engaged in the compartment of the tool holder and a second end, said first end of the tool comprising at least one neck;

at least one ball movable in said at least one hole only in a transverse direction of said compartment between a locking position where it is engaged with said neck and a releasing position where it is disengaged from said neck; said compartment and receptacle each having an upper end and lower end, each upper end being located adjacent to each other, said upper ends being spaced from lower ends with each ball and hole located there between; said tool projecting from said lower end of said compartment; and a rod received in the receptacle of the tool and having an end extending from said upper end of said receptacle for manual operation, said rod having at least one notch that faces said at least one hole, said rod being slidable between a first position for pushing said at least one ball to a said locking position and a second position for allowing the at least one ball to move to said releasing position; said rod being biasing by an elastic element located between said upper end of said receptacle and said end of said rod extending from said receptacle.

2. The tool holder and tool combination as claimed in claim 1, wherein the compartment of the tool holder and the first end of the tool are hexagonal.

3. The tool holder and tool combination as claimed in claim 1, wherein said receptacle comprises a countersink in an end thereof, and wherein the elastic element includes said upper end attached to a bottom end face defining the countersink.

4. The tool holder and tool combination as claimed in claim 1, wherein said at least one notch comprises an inclined face to guide movement of said at least one ball.

* * * * *